April 17, 1956

L. C. ROSASCO 2,742,258

FENCE POST DRIVER

Filed Dec. 14, 1953

INVENTOR
Lloyd C. Rosasco
BY Webster & Webster
ATTORNEYS

April 17, 1956 L. C. ROSASCO 2,742,258
FENCE POST DRIVER
Filed Dec. 14, 1953 2 Sheets-Sheet 2
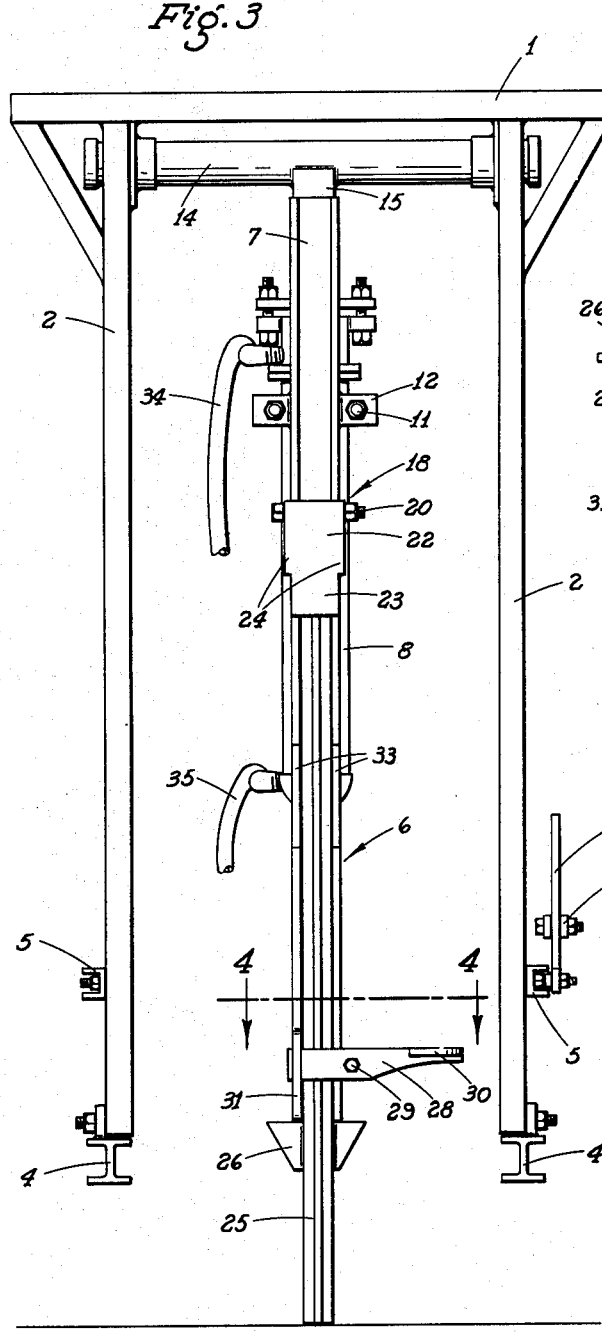
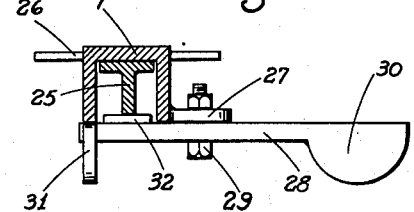
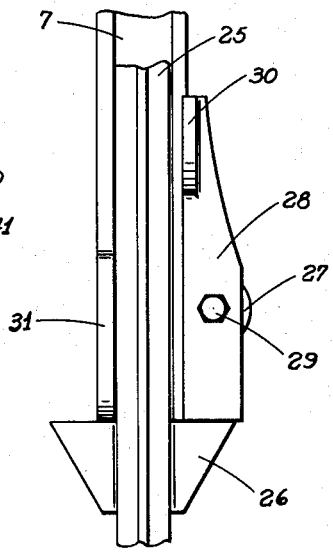
INVENTOR
Lloyd C. Rosasco
BY Webster & Webster
ATTORNEYS United States Patent Office 2,742,258
Patented Apr. 17, 1956

2,742,258
FENCE POST DRIVER
Lloyd C. Rosasco, Woodland, Calif.
Application December 14, 1953, Serial No. 398,077
3 Claims. (Cl. 254—29)

The present invention is directed to, and it is a major object to provide, a novel power actuated device for driving steel fence posts into the ground.

Another important object of the invention is to provide a power actuated fence post driver which is adapted to be mounted on a tractor for travel therewith along the line on which a fence is to be constructed; the device being operative to drive steel fence posts into the ground at selected points on such line, and such device being readily located at each such point by the simple expedient of maneuvering the tractor.

An additional object of the invention is to provide a tractor-mounted power actuated fence post driver which includes a novel, vertically reciprocable driving bar unit adapted to receive, support, and drive a steel fence post; such driving bar unit being connected to a fluid pressure actuated power cylinder which imparts the driving force to said unit and the post carried thereby.

A further object of the invention is to provide a fence post driver, as in the preceding paragraph, wherein said driving bar unit is of such construction that the post being driven is maintained in a stable position and prevented from having any undesirable lateral deflection or buckling, and which might otherwise occur when the post is subjected to the relatively great down-thrust of the power cylinder.

A still further object of the invention is to provide a fence post driver wherein the driving bar unit is automatically alined to perpendicular, whereby each post is driven into the ground in vertical position irrespective of longitudinal or lateral tilt of the tractor out of horizontal due to its resting on unlevel ground.

A separate object of the invention is to provide a fence post driver which comprises a unitary device capable of being readily and conveniently attached to or removed from a tractor.

It is also an object of the invention to provide a fence post driver which is of simple but rugged structure and one which is designed for ease and economy of manufacture.

Still another object of the invention is to provide a practical and reliable fence post driver, and one which will be exceedingly effective for the purpose for which it is designed.

These objects are accomplished by means of such structure and relative arrangement of parts as will fully appear by a perusal of the following specification and claims.

In the drawings:

Fig. 3 is a rear end elevation of the fence post driver, with the parts in the same position as in Fig. 1; the tractor being omitted.

Fig. 4 is a fragmentary sectional plan view on line 4—4 of Fig. 3.

Fig. 5 is an enlarged, fragmentary rear elevation showing the swinging holding lever in its open position.

Figure 1:
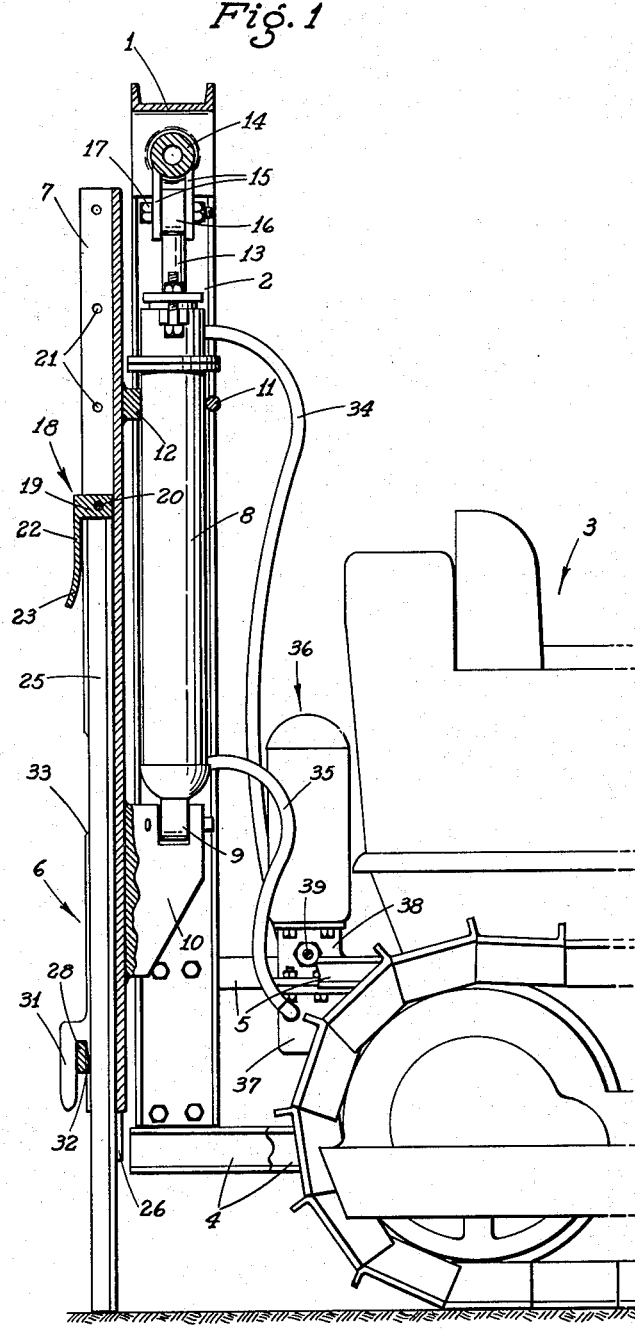
Fig. 1 is a side elevation, mainly in section of the fence post driver as mounted on a tractor for use; the power cylinder being retracted, and the driving bar unit in its raised position.
Figure 2:
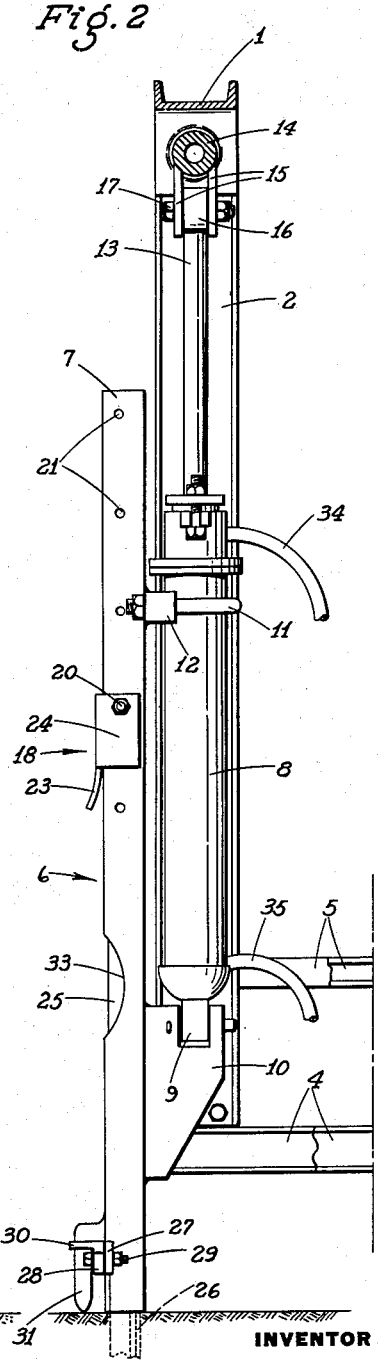
Fig. 2 is a side elevation, with the top cross shaft and the main frame in section, and with the near mounting beams partially broken away; the view showing the power cylinder as advanced, with the driving bar unit in lowered or fence post driving position.

Referring now more particularly to the drawings, and to the characters of reference marked thereon, the device comprises a relatively tall, upstanding, inverted U-shaped frame 1 which includes transversely spaced legs 2; such frame being rigidly but readily detachably secured to a tractor 3 at the rear end thereof by transversely spaced lower mounting beams 4 and similarly spaced upper mounting beams 5; the beams 4 and 5 being suitably detachably secured by bolting (not shown) to the rear end of the tractor body structure.

A perpendicular, fence post driving bar unit, indicated generally at 6, upstands in the frame 1 centrally between the legs 2 thereof, and such unit includes a relatively heavy-duty driving bar 7 which is of channel configuration in cross section, with said channel normally opening rearwardly.

A double acting, fluid pressure power cylinder or hydraulic ram 8 is disposed in an upstanding position and lies closely adjacent the front of the driving bar 7; the lower end of said power cylinder 8 being attached, as at 9, to a clevis block 10 on the front of the driving bar 7 adjacent but short of its lower end.

Additionally, the power cylinder 8 is secured, adjacent its upper end, to the driving bar 7 by a U-shaped clamp 11 connected to a cross member 12 on said bar.

The power cylinder 8 is disposed so that its piston rod projects upwardly, and such piston rod is swivelly suspended from the upper portion of the frame 1 as follows:

Adjacent the top thereof the frame 1 is provided with a transversely extending, horizontal cross shaft 14 which is turnably mounted, and intermediate the ends of said cross shaft the same is fitted with a pair of dependent ears 15 spaced in a front to rear direction. The upper end of the piston rod 13 is formed with an integral eye 16 which lies between the ears 15, being pivotally connected thereto by a generally horizontal pivot bolt 17 which extends lengthwise between said ears. With this arrangement the driving bar unit 6, together with the attached power cylinder 8, is self-alining vertically; i. e., the described swivel suspension of such parts, from the frame 1, permitting them to gravitationally seek a perpendicular position at all times. Thus, irrespective of the level of the ground on which the tractor 3 rests, the driving bar unit 6 always remains perpendicular, and to the end that the fence post may be driven, in the manner hereinafter described, vertically into the ground, as is requisite.

The rearwardly opening, channel shaped driving bar 7 is fitted with a vertically adjustable driving head unit, indicated generally at 18. Such driving head unit 18 comprises a driving block 19 which engages in the channel of the driving bar 7, being secured therein by a cross bolt 20. The vertical position of the driving block 19 may be adjusted up or down, and for this purpose vertically spaced holes 21, for the reception of the cross bolt 20, are formed in opposite sides of the driving bar 7. Adjustment of the driving head unit 18 up or down the driving bar 7 is for the purpose of accommodating the device to fence posts of different lengths.

The driving block 19 includes, on its outer side, an integral depending retention plate 22, the lower edge of which is formed as an outturned lip 23. Additionally, side plates 24 extend inwardly from the retention plate 22 and engage the opposite sides of the driving bar 7 exteriorly thereof.

With this arrangement the retention plate 22 defines a pocket in the channel shaped driving bar 7 below the driving block 19.

The fence post 25 to be driven, which post is T-shaped in cross section, is initially inserted into the driving bar 7 when the latter is in a raised position; the upper end portion of such post abutting against the bottom of the driving block 19 and being confined within the pocket formed by the retention plate 22 spanning between the sides of said driving bar 7.

When the post 25 is disposed in the channel shaped driving bar 7, as above, the rigid guide web 26 which such posts conventionally include adjacent but short of their lower ends, abuts the lower end of said driving bar (see Fig. 3).

While the retention plate 22 prevents the upper portion of the post 25 from escaping rearwardly from the channel shaped driving bar 7, additional retention of said post adjacent the lower end of such driving bar is necessary, and which is accomplished as follows:

The driving bar 7, adjacent its lower end and on one side, is fitted with a laterally projecting mounting ear 27, and a swingable holding lever 28 is pivoted, intermediate its ends, by a bolt 29 to the ear 27 for swinging motion between an upstanding position clear of the channel of the driving bar 7, as in Fig. 5, to a horizontal position with one end portion of said lever intersecting such channel (see Fig. 3). When the holding lever 28 is swung to its horizontal position, which is accomplished by means of a foot pad or pedal 30 on the outer end of the lever, its inner or other end portion not only intersects the channel of the driving bar 7, but engages from below and upwardly into a catch 31 fixed on said bar 7 on the side opposite the ear 27. When the holding lever 28 is swung to such horizontal position, engaging in the catch 31, a taper cam 32 on the inner portion of said lever 28 frictionally and wedgingly engages the adjacent part of the post 25, effectively binding such post in place in the driving bar 7.

The channel shaped driving bar 7 is formed on opposite sides with matching cut-aways, as at 33; this to permit of easy manual engagement, initially, of the post 25 in said bar.

After a post 25 has been placed in the initially raised channel-shaped driving bar 7, with the upper end of the post abutting the bottom of the driving block 19 and resting inwardly of the retention plate 22, and after swinging of the holding lever 28 to its operative position, the post—with the guide web 26 abutting the lower end of the bar 7—is ready for driving into the ground.

This is accomplished by actuation of the fluid pressure power cylinder 8 in a direction to cause expansion thereof, and which imparts a forceful downstroke to the driving bar 7, penetrating the post 25 a substantial distance into the ground.

The power cylinder 8, being of double-acting type, is caused to expand or contract in a substantially conventional manner; flexible conduits 34 and 35 leading from opposite ends of said cylinder to a valve controlled, hydraulic pressure supply unit 36 mounted on the tractor at the rear end and driven from the power take-off shaft in the usual manner. The unit 36 includes a hydraulic pump 37 and a control valve 38; the latter including a movable rod 39 which is operative to cause reversible hydraulic pressure flow to and from the power cylinder 8 through the flexible conduits 34 and 35. By the simple expedient of moving the rod 39 in one direction or the other, the power cylinder 8 can be caused to expand or retract at the will of the operator. It is preferred that the rod 39 be controlled from a point closely adjacent the upstanding frame 1, and to this end a hand lever 40 may be mounted on one of the upper supporting beams 5, with said lever 40 connected in actuating relation to the rod 39 by suitable linkage means, shown only in part at 41.

After each post 25 is driven into the ground the operator merely releases the swingable holding lever 28 and raises the driving bar 7 to its starting position, and which clears the driving head unit 18 from the post. Thereafter, the tractor can move forwardly away from the driven post and to the point where the next post is to be placed.

Adjustment of the driving head unit 18 up or down the driving bar 7 is for the purpose of accommodating the device to fence posts of different lengths.

The present invention provides a device whereby steel fence posts can be rapidly, positively, and accurately driven into the ground; each post being driven into the ground in a perpendicular position by reason of the fact that the driving bar 7 is self-alining to vertical, and which result is attained by reason of the swivel suspension assembly between the upper end of the piston rod 13 and the frame 1.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A fence post driver comprising, in connection with a support adapted for movement from point to point on the ground, an upstanding frame secured to the support, an upstanding driving bar adjacent the frame, means suspending the driving bar from the frame for a down-stroke from an initially raised position with the lower end of the bar spaced above the ground, means on the driving bar adapted to releasably hold a fence post thereon, with the lower end portion of said post projecting below the lower end of said bar, a driving head on the bar in position to engage the upper end of a post held on the bar, and means associated with said suspension means operative to impart a forceful down-stroke to the bar whereby to drive said lower end portion of the post into the ground; the driving bar being channel shaped and the post engaging in said bar, said holding means including a member normally spanning the open side of said bar, and means mounting the member for movement between a clearance position and said spanning position; said member including a cam wedgingly engaging the post when the member is in said last named position.

2. A fence post driver comprising, in connection with a support adapted for movement from point to point on the ground, an upstanding frame secured to the support, an upstanding driving bar adjacent the frame, means suspending the driving bar from the frame for a down-stroke from an initially raised position with the lower end of the bar spaced above the ground, the driving bar being channel shaped, a driving block in the bar a substantial distance above its lower end, means on the driving bar adapted to releasably hold a fence post therein with its upper end against the driving block and the lower portion of the post depending below said lower end of the bar, and means associated with said suspension means operative to impart a forceful down-stroke to the bar whereby to drive said lower end portion of the post into the ground; said holding means including a lever pivotally mounted on the bar for swinging motion between a position spanning the open side of the channel shaped bar and another position clear of said open side, and a cam on said lever adapted to engage and wedge the post in the channel shaped bar when the lever is in said spanning position.

3. A fence post driver comprising, in connection with a support adapted for movement from point to point on the ground, an upstanding frame secured to the support, an upstanding driving bar adjacent the frame, means on the driving bar to releasably hold a fence post with its lower end portion below the bar, a head fixed on the bar to engage the upper end of a post, a power ram behind the bar and including a cylinder rigid with said bar and a piston rod upstanding from the cylinder, and a combination longitudinal and transverse swivel connection between the upper end of the rod and the frame and providing suspension means for the driving bar whereby the latter is selfalining to the perpendicular; the frame including transversely spaced frame legs, and said suspension means including a horizontal rotatable cross shaft journaled on and extending between said frame legs and a pivot connection between the piston rod and the cross shaft under the same, said pivot connection having a horizontal axis disposed at right angles to the axis of the cross shaft.

References Cited in the file of this patent

UNITED STATES PATENTS

| | | |
|---|---|---|
| 1,595,420 | Robb | Aug. 10, 1926 |
| 1,856,893 | Tallboys | May 3, 1932 |
| 2,551,897 | Notestein | May 8, 1951 |
| 2,634,092 | Lindquist | Apr. 7, 1953 |
| 2,655,006 | Hoen et al. | Oct. 13, 1953 |
| 2,657,010 | Sabin et al. | Oct. 27, 1953 |

UNITED STATES PATENT OFFICE
CERTIFICATE OF CORRECTION

Patent No. 3,742,258             Dated June 26, 1973

Inventor(s) Thomas E. Clark

It is certified that error appears in the above-identified patent and that said Letters Patent are hereby corrected as shown below:

Claim 1, column 4, line 10, after "switching" the word -- means -- should be inserted.

Signed and sealed this 20th day of November 1973.

(SEAL)
Attest:

EDWARD M. FLETCHER, JR.       RENE D. TEGTMEYER
Attesting Officer      Acting Commissioner of Patents